(12) United States Patent
Mochizuki et al.

(10) Patent No.: US 8,953,427 B2
(45) Date of Patent: Feb. 10, 2015

(54) OPTICAL INFORMATION RECORDING MEDIUM

(71) Applicant: FUJIFILM Corporation, Minato-ku, Tokyo (JP)

(72) Inventors: Hidehiro Mochizuki, Odawara (JP); Tatsuo Mikami, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 3 days.

(21) Appl. No.: 13/864,746

(22) Filed: Apr. 17, 2013

(65) Prior Publication Data

US 2013/0229901 A1    Sep. 5, 2013

Related U.S. Application Data

(63) Continuation of application No. PCT/JP2011/072393, filed on Sep. 29, 2011.

(30) Foreign Application Priority Data

Oct. 19, 2010    (JP) ................................. 2010-234590

(51) Int. Cl.
*G11B 7/244*    (2006.01)
*B82Y 10/00*    (2011.01)
(Continued)

(52) U.S. Cl.
CPC ................. *G11B 7/244* (2013.01); *B82Y 10/00* (2013.01); *G11B 7/00452* (2013.01);
(Continued)

(58) Field of Classification Search
None
See application file for complete search history.

(56) References Cited

U.S. PATENT DOCUMENTS 4,719,615 A    1/1988    Feyrer et al.
4,852,075 A    7/1989    Feyrer et al.
(Continued)

FOREIGN PATENT DOCUMENTS

JP    64-14038 A    1/1989
JP    7-118090 B2    12/1995
(Continued)

OTHER PUBLICATIONS

Yuki Suzuki et al., :The static recording and readout of the twenty-recording layers containing organic dye materials, ISOM Technical Digest, 2009, pp. 202-203.
(Continued)

*Primary Examiner* — Wayne Young
*Assistant Examiner* — Dionne Pendleton
(74) *Attorney, Agent, or Firm* — Sughrue Mion, PLLC

(57) ABSTRACT

An optical information recording medium 10 comprises a plurality of recording layers 14 and intermediate layers 15 each provided between the recording layers 14. Each of the recording layers 14 includes a polymer binder and dye dispersed in the polymer binder, and a thickness of each recording layer is equal to or greater than 50 nm. A first interface (near-side interface 18) is formed between a recording layer 14 and an intermediate layer 15 that is adjacent to the recording layer 14 on one side of the recording layer 14 in a thickness direction of the recording layer 14, and a second interface (far-side interface 19) is formed between the recording layer 14 and an intermediate layer 15 that is adjacent to the recording layer 14 on the other side of the recording layer 14 in the thickness direction of the recording layer 14. When the dye is irradiated with a recording beam and generates heat by absorption of the recording beam, the polymer binder undergoes a change in shape by the generated heat, so that at least one of the first interface and the second interface undergoes a change in shape and sticks out toward the intermediate layer 15 to form a protrusion, whereby information is recorded in the optical information recording medium 10.

13 Claims, 7 Drawing Sheets

(51) Int. Cl.
*G11B 7/0045* (2006.01)
*G11B 7/245* (2006.01)
*G11B 7/246* (2013.01)
*G11B 7/24038* (2013.01)
*G11B 7/248* (2006.01)
*G11B 7/2531* (2013.01)

(52) U.S. Cl.
CPC ............... *G11B 7/245* (2013.01); *G11B 7/246* (2013.01); *G11B 7/24038* (2013.01); *G11B 7/248* (2013.01); *G11B 7/2531* (2013.01)
USPC ............. 369/94; 369/284; 369/286; 369/280; 369/283

(56) References Cited

U.S. PATENT DOCUMENTS

| | | | |
|---|---|---|---|
| 4,912,696 | A | 3/1990 | Feyrer et al. |
| 6,307,824 | B1 | 10/2001 | Kuroda et al. |
| 6,587,424 | B2 | 7/2003 | Kuroda et al. |
| 2002/0003771 | A1 | 1/2002 | Kuroda et al. |
| 2005/0219994 | A1* | 10/2005 | Fukuzawa et al. ......... 369/275.2 |
| 2008/0291816 | A1* | 11/2008 | Nakamura et al. ............. 369/284 |
| 2009/0161502 | A1* | 6/2009 | Shiono ....................... 369/44.22 |
| 2009/0246443 | A1 | 10/2009 | Akiba et al. |
| 2009/0269540 | A1* | 10/2009 | Horie et al. ................... 428/64.4 |
| 2010/0035013 | A1 | 2/2010 | Kubo et al. |
| 2010/0055448 | A1 | 3/2010 | Tomura et al. |
| 2010/0097914 | A1* | 4/2010 | Habuta et al. ................. 369/100 |
| 2010/0309759 | A1* | 12/2010 | Sato et al. .................. 369/44.26 |

FOREIGN PATENT DOCUMENTS

| | | | |
|---|---|---|---|
| JP | 2771231 | B2 | 7/1998 |
| JP | 2000-132865 | A | 5/2000 |
| JP | 2001-184720 | A | 7/2001 |
| JP | 2004-95142 | A | 3/2004 |
| JP | 2004-103183 | A | 4/2004 |
| JP | 2004-288264 | A | 10/2004 |
| JP | 4014690 | B2 | 11/2007 |
| JP | 2008-87476 | A | 4/2008 |
| JP | 2008-130102 | A | 6/2008 |
| JP | 2009-221563 | A | 10/2009 |
| JP | 2009-259383 | A | 11/2009 |

OTHER PUBLICATIONS

Kurt F. Wissbrun, "Thermal expansion and flow model for pit formation in laser marking of polymeric film optical disks", J. Appl. Phys., Aug. 1, 1987, pp. 1123-1124, vol. 62, No. 3.
International Search Report (2 pages) for PCT/JP2011/072393 dated Jan. 10, 2012 Written Opinion (3 pages in Japanese) English Translation.
Japanese Office Action issued in JP Application No. 2010-234590 dated Jan. 28, 2014, 5 pages in Japanese and English.

* cited by examiner

DURING READING

FIG.4
COMPARATIVE EXAMPLE
(a)
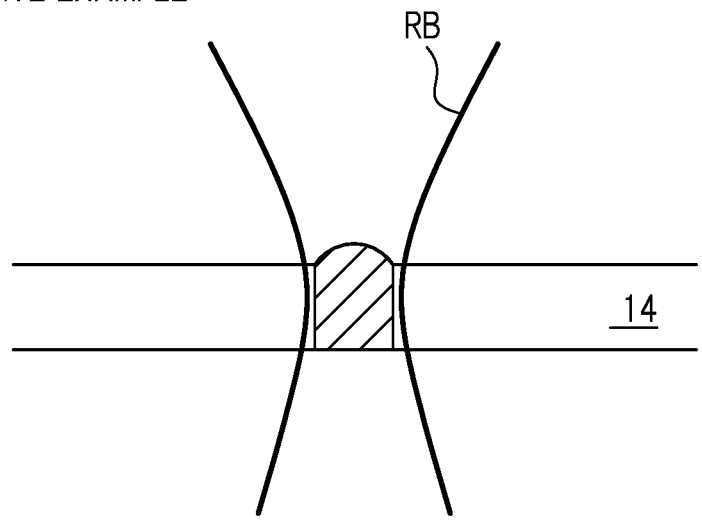
(b)
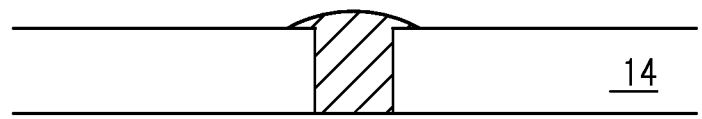
(c)
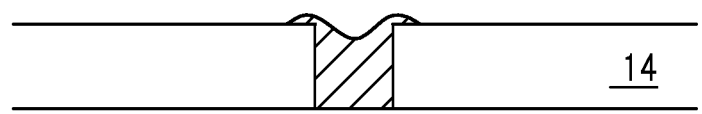

FIG.5

| | Example 1 | Example 2 | Example 3 | Example 4 | Comparative Example 1 | Comparative Example 2 |
|---|---|---|---|---|---|---|
| Polymer binder | PVAc | PVAc | PVAc | PMMA | None | Polybisphenol-A-carbonate |
| Dye | C-1 | C-2 | C-1 + C-2 | C-2 | C-2 | C-2 |
| Glass transition temperature of Polymer binder [°C] | 32 | 32 | 32 | 104 | - | 147 |
| Melting point or Decomposition point [°C] | 349 | 138 | 138 | 138 | 138 | 138 |
| Film thickness [μm] | 1.0 | 1.0 | 1.0 | 1.0 | 0.1 | 1.0 |
| Refractive index of Recording layer [%] | 1.48 | 1.48 | 1.48 | 1.50 | 1.60 | 1.60 |
| Absorption ratio (Wavelength: 522 nm) [%] | 1.8 | 0 | 1.8 | 0 | 1.8 | 0 |
| Time required for Recording [μsec] | 15 | 90 | 5 | 450 | Unrecordable | Unrecordable |

OPTICAL INFORMATION RECORDING MEDIUM

CROSS-REFERENCE TO RELATED APPLICATION(S)

This application is a continuation application of International Application No. PCT/JP2011/072393 filed on Sep. 29, 2011, which claims priority to Japanese Patent Application No. 2010-234590 filed on Oct. 19, 2010, the disclosures of which are incorporated herein by reference in their entity.

TECHNICAL FIELD

The present invention relates to an optical information recording medium.

BACKGROUND ART

In general, as recording materials for an optical information recording medium, organic recording materials mainly consisting of dye and inorganic recording materials mainly consisting of metal have been used. These recording materials change (decomposition, phase change or the like) by making use of energy obtained from absorption of a recording beam, to thereby form recording spots. For applying this principle of recording spot formation, it is necessary that irradiation with the recording beam provides a recording material with energy required to raise the temperature of the recording material to a temperature at which the recording material undergoes decomposition or a phase change.

In recent years, as a technique for greatly increasing the capacity of an optical information recording medium, study has been made on a three-dimensional recording in which information is recorded in multiple layers of a single recording medium. In the three-dimensional recording, it is necessary that the light absorption ratio of the recording layers be set to a smaller value in order to allow the recording beam to reach deeper recording layers. However, according to the recording materials used for the conventional optical information recording medium, if the light absorption ratio is lowered, the recording layer will not receive sufficient energy from the recording beam, which results in insufficient recording sensitivity.

Patent Literature 1 discloses other recording methods, in which in place of the recording material mainly consisting of dye which undergoes a change, a polymer binder which contains dye is used in a recording material, and the polymer binder undergoes a change by receiving energy that is absorbed by the dye. It is thought that the optical information recording medium disclosed in Patent Literature 1 requires the absorption ratio of the recording layer at least not smaller than 20% in order to provide a recess portion at an illuminated portion in the recording material.

CITATION LIST

Patent Literature

Patent Literature 1: Japanese laid-open patent application publication No. 01-014038

SUMMARY OF THE INVENTION

Technical Problem

Under the circumstances of the above-described background, the inventors of the present invention found out a phenomenon adoptable to a new recording method by which highly sensitive recording can be made on a recording material containing dye and a polymer binder, by accident during the research of a highly sensitive optical information recording medium.

In view of this, the present invention seeks to provide a multi-layered optical information recording medium in which information is recordable with high sensitivity using a new recording method.

Solution to Problem

In order to solve the aforementioned problem, the present invention provides an optical information recording medium comprising: a plurality of recording layers; and intermediate layers each provided between the recording layers, wherein each of the recording layers includes a polymer binder and dye dispersed in the polymer binder, and a thickness of each recording layer is equal to or greater than 50 nm, wherein a first interface is formed between a recording layer and an intermediate layer that is adjacent to the recording layer on one side of the recording layer in a thickness direction of the recording layer, and a second interface is formed between the recording layer and an intermediate layer that is adjacent to the recording layer on the other side of the recording layer in the thickness direction of the recording layer, and wherein when the dye is irradiated with a recording beam and generates heat by absorption of the recording beam, the polymer binder undergoes a change in shape by the generated heat, so that at least one of the first interface and the second interface undergoes a change in shape and sticks out toward the intermediate layer to form a protrusion, whereby information is recorded in the optical information recording medium.

With this configuration, when the optical information recording medium is irradiated with the recording beam having an appropriate light intensity while the recording beam is brought into focus on one recording layer, the temperature of the irradiated area increases and this induces thermal expansion. The optical information recording medium according to the present invention includes recording layers each having the thickness not smaller than 50 nm, which is thicker than the recording layer included in the conventional optical information recording medium containing a polymer binder and dye, with the result that the recording beam-irradiated area changes its shape such that the center portion thereof has a shape protruding toward the adjacent intermediate layer. Although the reason for this phenomenon is unknown, to put it briefly, it is assumed that softening and thermal expansion of the polymer binder due to the energy given to the recording layer occurs violently inside the recording layer, but less violently in the proximity of the intermediate layer, and hence a protrusion having a shape protruding toward the intermediate layer is formed by the thermal expansion and thereafter the protrusion hardens by decrease in temperature of the recording layer while the protruding shape remains.

Accordingly, since information is recorded in the optical information recording medium using protrusions sticking out from the recording layer toward the intermediate layer, it is not necessary to require an energy up to such an extent that decomposing or changing in phase of the recording material occurs as in the conventional optical information recording medium, nor does it require the absorption ratio of the recording layer as high as 20% which is required by the recording method disclosed in Patent Literature 1 for providing recess portions for recording information. In other words, a highly sensitive optical information recording medium can be provided, in which the required absorption ratio of the recording beam per recording layer is smaller and thus the number of recording layers can be increased.

In the aforementioned optical information recording medium, it is preferable that the protrusion is surrounded by a recess portion recessed toward the recording layer.

If there is a recess portion surrounding the protrusion and recessed toward the recording layer as described above, a contrast can be obtained between the protrusion and its surrounding area when the recorded protrusion is irradiated with a reading beam. This can ease optical reading from the optical information recording medium.

It is preferable that the intermediate layer is softer than the recording layer at least in the proximity of the interface in which the protrusion is formed. In terms of glass transition temperatures of the recording layer and the intermediate layer, it can also be said that a glass transition temperature of the intermediate layer in the proximity of the interface in which the protrusion is formed is lower than that of the recording layer. Further, to put it differently in another specific embodiment, it can also be said that the recording layer is a solid layer and the intermediate layer is a tacky layer.

Since the intermediate layer is softer than the recording layer in the proximity of the interface in which the protrusion is formed, when the recording beam-irradiated area thermally expands, the intermediate layer is liable to deform by the pressure caused by the thermal expansion. Accordingly, the protrusion is more likely to remain in the interface. To compare the hardnesses of the recording layer and the intermediate layer, the materials used for forming the recording layer and the intermediate layer are made into bulk bodies, and then they are pressed to each other to check the hardness. To be more specific, when the bulk bodies are pressed to each other, it can be checked that the softer one will be recessed more deeply than the harder one.

In the aforementioned optical information recording medium, it is preferable that the protrusion is formed at only one of the first interface and the second interface, and the protrusion is not formed at the other one of the second interface and the first interface, and that a difference between refractive indices of the intermediate layer and the recording layer is greater at the interface in which the protrusions is formed than at the interface in which the protrusion is not formed.

If the protrusion is formed at only one of the first interface and the second interface, the interface in which the protrusion is formed is used for reading out information; in this case, it is preferable that the difference between refractive indices of the materials is large at both sides of this interface so that the interface reflectivity becomes larger and thus reading the information can be performed easily. Meanwhile, the interface in which the protrusion is not formed is not used for reading out the information; in this case, it is preferable that the difference of refractive indices of the materials can be small at both sides of this interface so that the transmittance for a light beam used for recording or reading information (hereinafter referred to as a "record/readout beam") (i.e., transmittance for both the first interface and the second interface) can be enhanced. Accordingly, in the case of multi-layered recording layers, the light beam can reach far deeper recording layers from the record/readout beam radiation side. This is advantageous for increasing the storage capacity by increasing the number of recording layers.

In the aforementioned configuration, it is preferable that the refractive index of the intermediate layer at the interface in which the protrusion is not formed is substantially equal to the refractive index of the recording layer. If the refractive indices of these layers located at both sides of the interface are substantially the same, the light reflectivity of this interface is substantially zero. Accordingly, in the case of multi-layered recording layers, the light beam can reach far deeper recording layers from the record/readout beam radiation side. This is advantageous for increasing the storage capacity by increasing the number of recording layers.

In the aforementioned optical information recording medium, the protrusion may stick out in the range of 1-300 nm as compared to the interface before undergoing a change in shape. Further, in the aforementioned optical information recording medium, the dye may contain, as one example, a multi-photon absorption compound.

Other aspects and advantages of the present invention will become apparent from the following description taken in conjunction with the accompanying drawings.

BRIEF DESCRIPTION OF THE DRAWINGS

FIG. 4 includes views (a) to (c) explaining a process of forming a recess portion in the conventional optical information recording medium.

FIG. 5 is a table showing the results of experiments.

DESCRIPTION OF EMBODIMENT

One exemplified embodiment of the present invention will be described below with reference to the drawings.

Figure 1:
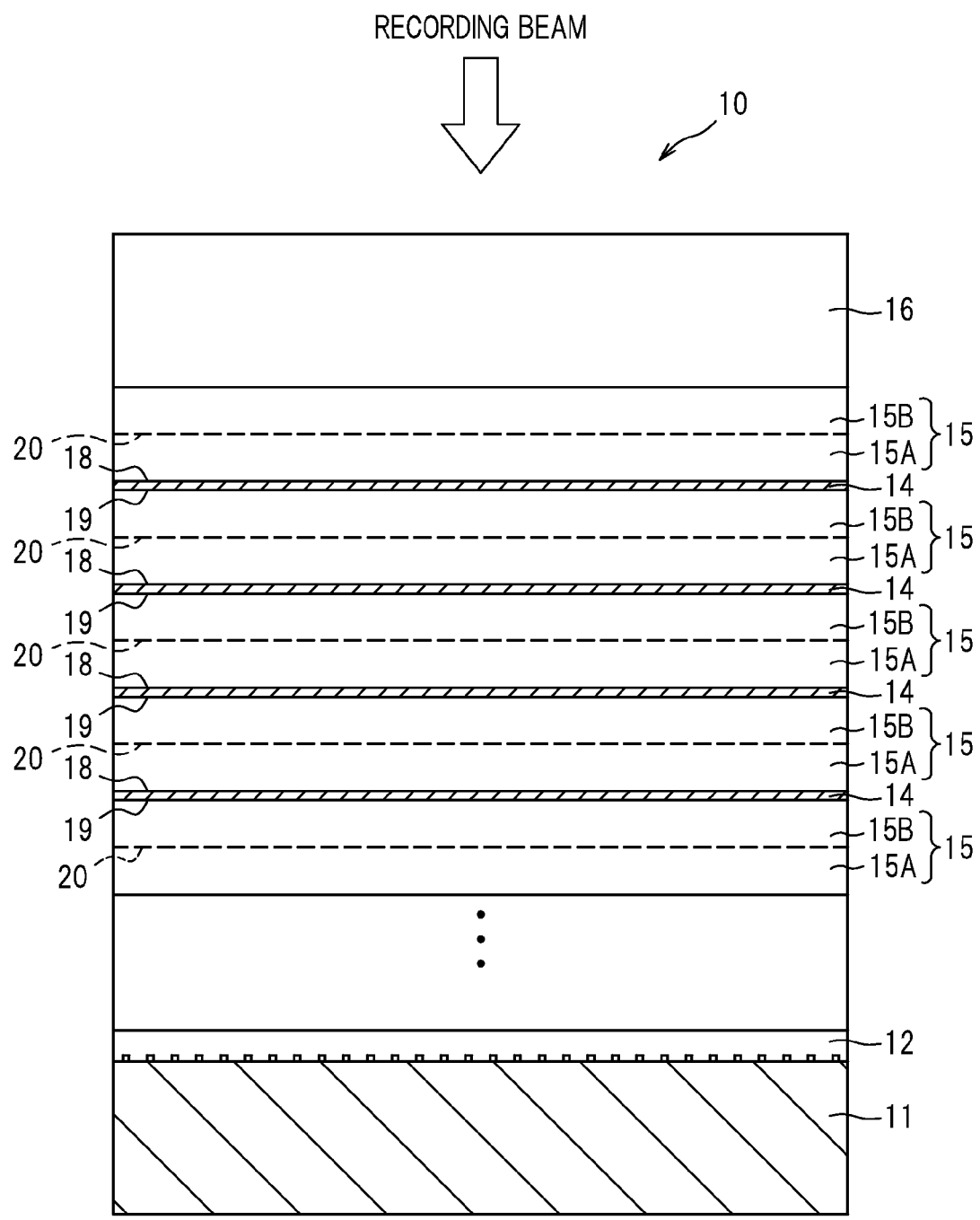
FIG. 1 is a sectional view of a multi-layered optical information recording medium.

As seen in FIG. 1, an optical information recording medium 10 comprises a substrate 11, a servo signal layer 12, a plurality of recording layers 14, a plurality of intermediate layers 15 (first intermediate layers 15A and second intermediate layers 15B), and a cover layer 16. In this embodiment, the interface between the recording layer 14 and the first intermediate layer 15A is referred to as a "near-side interface 18" as an example of a first interface, and the interface between the recording layer 14 and the second intermediate layer 15B is referred to as a "far-side interface 19" as an example of a second interface. Further, the interface between the first interface 15A and the second interface 15B is referred to as an "intermediate interface."

The substrate 11 is a support member for supporting the recording layers 14 and other layers. As an example, the substrate 11 is a circular plate made of polycarbonate. The material and the thickness of the substrate 11 are not specifically limited.

The servo signal layer 12 is made of a tacky or adhesive resinous material and configured to retain the recording layers 14 and the intermediate layers 15 on the substrate 11. A servo signal is previously recorded in the servo signal layer 12 at a surface close to the substrate 11; the servo signal is recorded as an irregular pattern or by utilizing the change in the refractive index. Herein, the servo signal is a previously set signal for assisting a recording and reading apparatus 1 to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided. It is to be noted that the presence or absence of the servo signal layer 12 may be optional.

The recording layer 14 is made of a photosensitive material on which information is optically recordable; in this embodiment, the recording layer 14 contains a polymer binder and dye dispersed in the polymer binder. When the recording layer 14 is irradiated with a recording beam, the dye absorbs the recording beam and generates heat. The polymer binder undergoes a change in shape by the generated heat, so that the near-side interface 18 undergoes a change in shape and sticks out toward the first intermediate layer 15A to form a protrusion, whereby information is recorded in the recording layer 14. To be more specific, each protrusion is formed, as will be described later, such that the center portion thereof has a shape protruding from the recording layer 14 toward the first intermediate layer 15A, and the protrusion is surrounded by a recess portion which is recessed from the first intermediate layer 15A toward the recording layer 14; the recess portion has a recess shape when considering the recording layer 14 as a reference.

For this reason, each recording layer 14 is thicker than the conventional recording layer containing a polymer binder and dye, and the thickness of the recording layer 14 is in the range of 50 nm to 5 µm, preferably in the range of 100 nm to 3 µm, more preferably in the range of 200 nm to 2 µm. If the thickness is less than 50 µm, as with the conventional recording layer, the interface between the recording layer 14 and the intermediate layer 15 (corresponding to the near-side interface 18 or the far-side interface 19 in this embodiment) deforms such that a recessed shape is formed in the interface when considering the recording layer 14 as a reference. On the contrary, if the thickness is not less than 50 µm, the interface deforms such that a protrusion is formed at a center of the recorded portion. Although the thickness of the recording layer 14 does not have an upper limit, it is preferable that the thickness thereof is not more than 5 µm in order to increase the number of recording layers 14 as many as possible.

In this embodiment, as an example, the number of recording layers 14 provided is approximately from 2-100 layers. To increase the storage capacity of the optical information recording medium 10, a large number of recording layers 14, for example, 10 or more recording layers 14 are preferable. Further, the refractive index of the recording layer 14 may or may not change before and after recording.

It is preferable that the recording layer 14 has an absorption ratio (of one-photon absorption) with respect to the recording beam equal to or less than 5% per one layer. Further, it is more preferable that this absorption ratio is equal to or less than 2%, and it is further more preferable that the absorption ratio is equal to or less than 1%. This is because, for example, if the intensity of the recording beam which reaches the farthermost recording layer 14 has to be equal to or more than 50% of the intensity of the radiated recording beam, it is necessary that the absorption ratio per one recording layer is equal to or less than 2% in order to obtain thirty-layered recording layers, and it is necessary that the absorption ratio per one recording layer is equal to or less than 1% in order to obtain fifty-recording layers. If the absorption ratio is higher, the recording layer 14 is subject to be overheated and a protrusion is less likely to be formed in the near-side interface 18.

The recording layer 14 may be formed by any conventional method; for example, a dye material and a polymer binder are dissolved in a solvent, followed by spin coating with the obtained liquid to form a recording layer 14. Examples of the solvent may include dichloromethane, chloroform, methyl ethyl ketone (MEK), acetone, methyl isobutyl ketone (MIBK), toluene, and hexane.

Specific examples of the polymer binder used for the recording layer 14 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), and polyvinyl alcohol (PVA).

Examples of the recording beam-absorbing dye used for the recording layer 14 may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording on and reading from the recording medium having a multi-layered recording layers, it is preferable that a multi-photon absorption dye is used as the recording beam-absorbing dye. As an example of the multi-photon-absorption dye, a two-photon absorption compound without having a linear absorption band at the wavelength of a reading beam is preferable.

As long as the two-photon absorption compound does not have a linear absorption band at the wavelength of the reading beam, any known two-photon absorption compound may be used; for example, compounds having a structure represented by the following formula (1) may be used.

[Chem. 1]

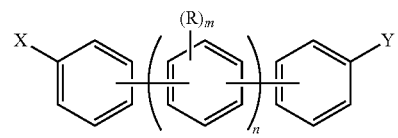

Formula (1)

In Formula (1), each of X and Y may represent a substituent having a Hammett's sigma para-value (σp value) of 0 or more, which may be the same with or different from each other; n represents an integer of 1 to 4; R represents a substituent, and a plurality of Rs may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength band shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

[Chem. 2]

D-1
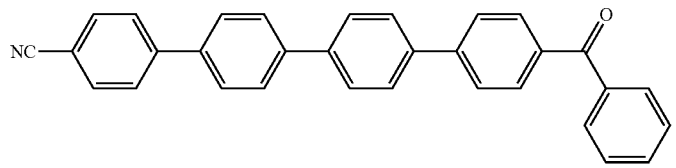

D-2
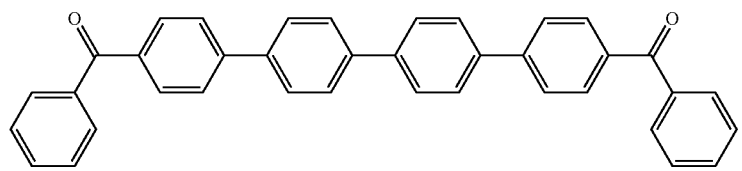

D-3
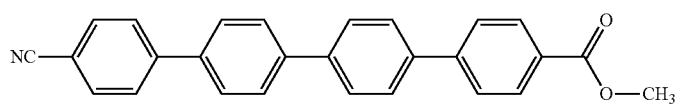

D-4
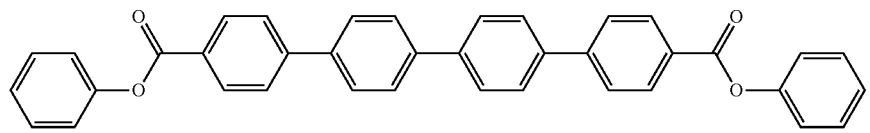

D-5 D-6
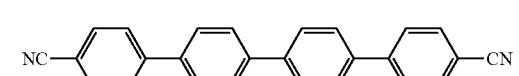

D-7 D-8
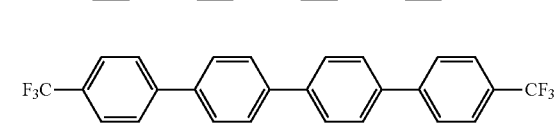

D-9
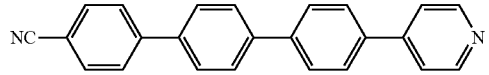

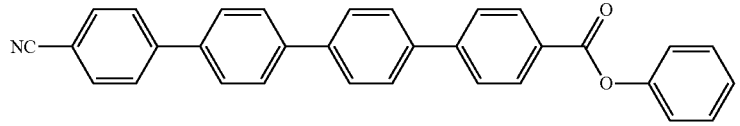

D-10
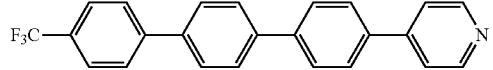

D-11
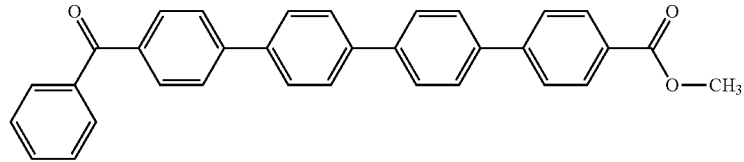

-continued
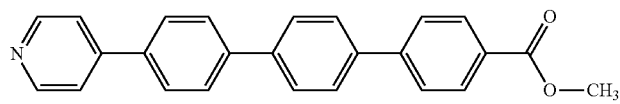
D-12
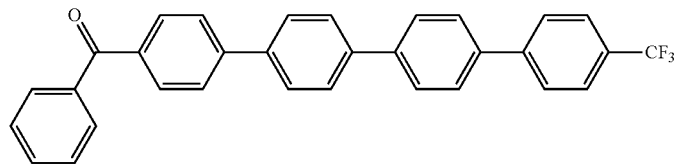
D-13
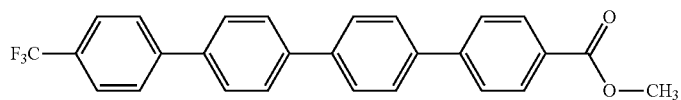
D-14
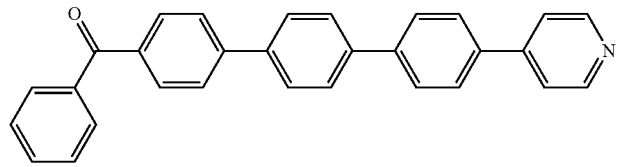
D-15
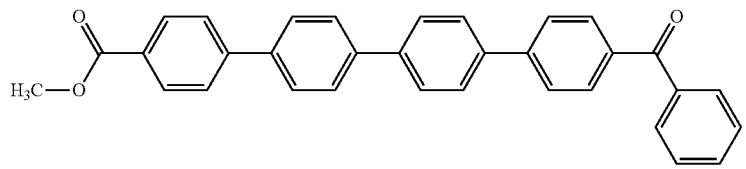
D-16
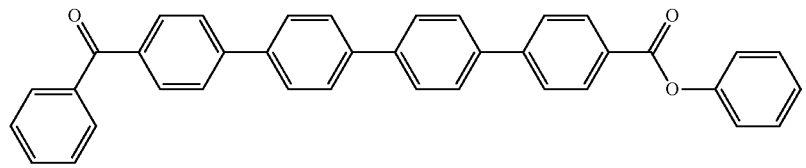
D-17
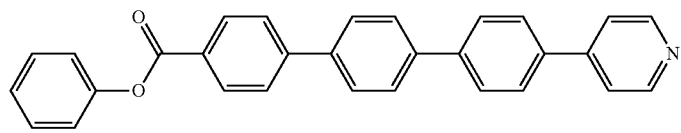
D-18
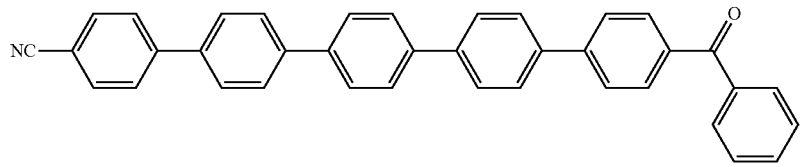
D-19
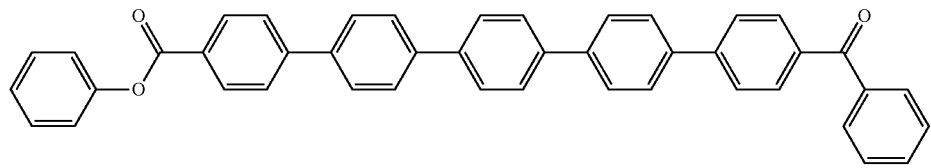
D-20
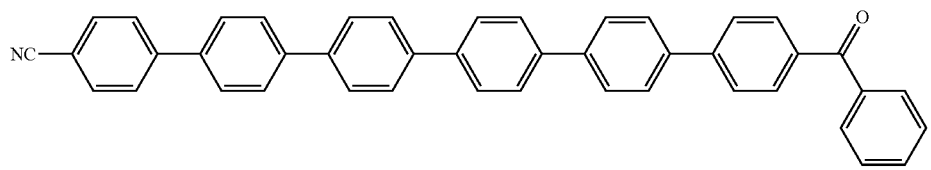
D-21

The intermediate layer 15 is provided between the recording layers 14. In other words, intermediate layers 15 are provided at positions adjacently above and below each of the recording layers 14. In order to prevent crosstalk across a plurality of recording layers 14 (i.e., phenomenon in which a signal from one recording layer 14 is mixed with another signal from an adjacent recording layer 14), the intermediate layer 15 is provided to form a predetermined amount of space between the adjacent recording layers 14. For this purpose, the thickness of the intermediate layer 15 is equal to or more than 3 μm. As an example, the intermediate layer 15 is 10 μm thick in this embodiment.

Each (one) intermediate layer 15 includes a first intermediate layer 15A, and a second intermediate layer 15B adjacent to and disposed at the upper side of the first intermediate layer 15A. The first intermediate layer 15A is adjacent to the upper side of the recording layer 14, on which the recording beam is incident, and the second intermediate layer 15B is adjacent to the lower side of the recording layer 14 that is the opposite side of the upper side.

The first intermediate layer 15A and the second intermediate layer 15B are made of materials which are unreactive to irradiation with a laser beam at the time of recording and reading out the information. Further, in order to minimize the loss of the recording beam, the reading beam, and the readout beam (light including a regeneration signal generated by irradiation with the reading beam), it is preferable that the first intermediate layer 15A and the second intermediate layer 15B are made of resin which is transparent to the recording beam, the reading beam, and the readout beam. Herein, the term "transparent" indicates that the absorption ratio determined by taking into consideration the absorption ratio of the first intermediate layer 15A and the absorption ratio of the second intermediate layer 15B is equal to or less than 1%.

As seen from a direction from which the recording beam and other beams enter the recording layer 14 (i.e., from upper side of FIG. 1), the first intermediate layer 15A is adjacent to and disposed at the upper side (near side) of the recording layer 14. The refractive index of the first intermediate layer 15A is different from that of the recording layer 14. Accordingly, reflection of the reading beam derived from an abrupt change in the refractive index occurs at an interface (near-side interface 18) between the recording layer 14 and the first intermediate layer 15A. It is preferable that the refractive index of the first intermediate layer 15A be different to some appropriate degree from that of the recording layer 14. To be more specific, it is preferable that the following relation is satisfied:

$$0.001 < ((n2-n1)/(n2+n1))^2 < 0.04$$

where n1 is a refractive index of the recording layer 14, and n2 is a refractive index of the first intermediate layer 15A.

If $((n2-n1)/(n2+n1))^2$, that is, the refractive index is greater than 0.001, the quantity of the light reflected at the near-side interface 18 is large, so that a high signal-to-noise ratio is obtained at the time of reading the information. If the refractive index is smaller than 0.04, the quantity of the light reflected at the near-side interface 18 is restricted to an appropriately small degree, so that the record/readout beam can reach far deeper recording layers 14 without considerable attenuation upon recording and reading out the information. This makes it possible to achieve high storage capacity of the optical information recording medium 10 by providing a large number of recording layers 14.

As an example, the refractive index n2 of the first intermediate layer 15A is 1.61. If the refractive index n1 of the recording layer 14 is 1.40, $((n2-n1)/(n2+n1))^2$ is 0.0049 and the aforementioned inequality expression is satisfied.

In this embodiment, the first intermediate layer 15A is softer than the recording layer 14. To be more specific, for example, the glass transition temperature of the first intermediate layer 15A is lower than that of the recording layer 14. As an alternative example, the recording layer 14 and the first intermediate layer 15A may be a solid layer and a tacky layer, respectively. These configurations may be obtained by appropriately selecting the polymer binder (resin) used as a material for the recording layer 14 and resin used as a material for the first intermediate layer 15A.

According to the configuration in which the first intermediate layer 15A is softer than the recording layer 14, when the recording layer 14 is heated and expanded by the recording beam, the first intermediate layer 15A is easily deformable to facilitate the deformation of the near-side interface 18.

As seen from the direction from which the recording beam or other beam enters the recording layer 14, the second intermediate layer 15B is adjacent to and disposed at the lower side (far side) of the recording layer 14. The refractive index of the second intermediate layer 15B is substantially the same as that of the recording layer 14. According to the present invention, it is preferable that the reflectivity observed at the interface (far-side interface 19) between the recording layer 14 and the second intermediate layer 15B is sufficiently smaller than that observed at the near-side interface 18. In other words, it is preferable that the difference of refractive indices between the second intermediate layer 15B (which forms the far-side interface 19 where no protrusion is formed) and the recording layer 14 is smaller than the difference of refractive indices between the first intermediate layer 15A (which forms the near-side interface 18 where protrusions are formed) and the recording layer 14. If the light reflected from the far-side interface 19 and the light reflected from the near-side interface 18 interfere with each other, the reproduction output would be higher or lower in accordance with a change in the thickness of the recording layer 14. Such fluctuation in the reproduction output shows that even an extremely small error (e.g., a fraction of the wavelength of the readout beam or less) is not permitted in the thickness of the recording layer 14. And it is very difficult to manufacture an actual medium such that recording layers 14 having, for example, 1 μm thick are accurately and uniformly formed so as not to cause any fluctuation in the reproduction output as described above. From this point of view too, it is desirable that the reflectivity at the far-side interface 19 is sufficiently smaller than that at the near-side interface 18.

From the view point described above, in the present invention, the reflectivity at the far-side interface 19 is equal to or less than one-fifth of the reflectivity at the near-side interface 18, preferably equal to or less than one-tenth, and most preferably, the reflectivity at the far-side interface 19 is 0. To satisfy this condition, it is necessary that the recording layer 14 and the second intermediate layer 15B have substantially the same refractive index. To be more specific, "the refractive index is substantially equal" in this specification means that the difference between the refractive index of the recording layer 14 and the refractive index of the second intermediate layer 15B is equal to or less than 0.05, preferably equal to or less than 0.03, more preferably equal to or less than 0.01, and most preferably, the difference between them is 0. Accordingly, reflection derived from an abrupt change in the refractive index does not occur at the far-side interface 19, so that the record/readout beam is allowed to pass though the far-side interface 19 without reflection.

In order to make the difference between the refractive index of the recording layer 14 and the refractive index of the second intermediate layer 15B smaller and preferably to 0, the composition of the material for the recording layer 14 and the composition of the material for the second intermediate layer 15B can be adjusted. To be more specific, since the material for the recording layer 14 contains dye such as a two-photon absorption compound to be mixed in a polymer binder, the dye or the polymer binder may be selectively adjusted to have an appropriate refractive index and to vary the composition ratio, whereby the refractive index of the recording layer 14 can be optionally adjusted. The refractive index of the polymer binder varies depending on the degree of polymerization even if they have similar basic components. For this reason, the refractive index of the recording layer 14 can also be adjusted using polymer binders with different degrees of polymerization or by adjusting the degree of polymerization of the polymer binder. Further, the refractive index of the recording layer 14 can be adjusted by mixing a plurality of polymer binders. Further, a refractive index matching material (inorganic particulate and the like) may be added to adjust the refractive index of the recording layer 14.

To adjust the refractive index of the second intermediate layer 15B, the degree of polymerization of the polymer material such as resin usable as the material for the second intermediate layer 15B may be adjusted. As an alternative, to adjust the refractive index of the second intermediate layer 15B, a material usable for the intermediate layer 15 may be optionally added or a refractive index matching material (inorganic particulate and the like) may be added.

In this embodiment, the second intermediate layer 15B may have a hardness equal to or higher than the recording layer 14. To be more specific, the second intermediate layer 15B may be formed such that a glass transition temperature thereof is equal to or higher than the glass transition temperature of the recording layer 14. This configuration is achieved by appropriately selecting a resin usable as the material for the recording layer 14 and a resin usable as the material for the second intermediate layer 15B.

It is preferable that the first intermediate layer 15A and the second intermediate layer 15B, by which one intermediate layer 15 is formed, are merged with each other at the interface (intermediate interface 20) therebetween, whereby the refractive index gradually changes at this interface. Namely, an interface is not clearly formed at the intermediate interface 20. Accordingly, reflection derived form an abrupt change in the refractive index does not occur at the intermediate interface 20, so that the record/readout beam is allowed to pass though the intermediate interface 20 without reflection.

This configuration of the interface where the first intermediate layer 15A and the second intermediate layer 15B are merged with each other can be obtained, for example, by mixing a light curing resin into the first intermediate layer 15A and the second intermediate layer 15B and hardening these layers. In this process, the material for the second intermediate layer 15B is applied after the material for the first intermediate layer 15A is applied and before the material is caused to cure to provide the first intermediate layer 15A, so that subsequent irradiation with light hardens and provides the first intermediate layer 15A and the second intermediate layer 15B at the same time.

In this embodiment, the intermediate layer 15 consists of two layers including the first intermediate layer 15A and the second intermediate layer 15B. However, three or more layers may be formed to gradually change the refractive index in the intermediate layer 15. As an alternative, only one intermediate layer 15 may be provided, in which the refractive index gradually changes.

The cover layer 16 is provided to protect the recording layers 14 and the intermediate layers 15 (first intermediate layers 15A and second intermediate layers 15B). The cover layer 16 is made of a material which allows the record/readout beam to pass through the cover layer 16. The cover layer 16 has an appropriate thickness in the range from several tens micro meters to several millimeters.

Description will be given of the method for recording information on and reading out the information from the optical information recording medium 10 as described above.

Figure 2:
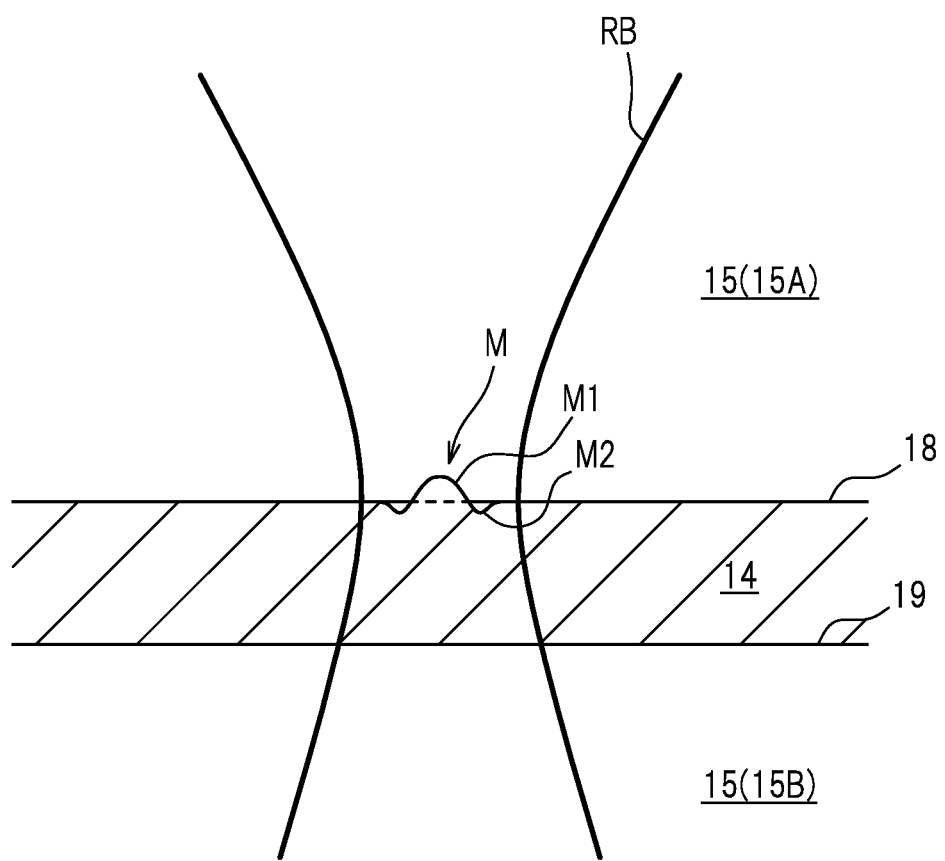
FIG. 2 is a view showing a recording spot formed at the time of recording information.

To record information in a desired recording layer 14, as seen in FIG. 2, the recording layer 14 is irradiated with a laser beam (recording beam RB) output of which is modulated in accordance with the information to be recorded. If the recording layer 14 contains a multi-photon absorption compound as a recording dye, it is preferable that the laser beam used for this recording may be a pulsed laser beam, the peak power of which can be increased. Although a focal position of the recording beam RB is not limited to a specific position, it is preferable that the recording beam RB is focused on or around the near-side interface 18, on or around the far-side interface 19, or between the near-side interface 18 and the far-side interface 19.

When irradiating the recording layer 14 with the recording beam RB, as seen in FIG. 2, the recording beam-irradiated area changes its shape such that the center portion thereof has a shape protruding from the recording layer 14 toward the first intermediate layer 15A, to thereby form a recording spot M. More specifically, the recording spot M includes a protrusion M1 at the center portion, and a ring-shaped recess portion M2 surrounding the protrusion M1 and recessed toward the recording layer 14. The distance (depth) of the recessed portion M2 from the near-side interface 18 (the near-side interface 18 before undergoing a change in shape) to the deepest portion of the recessed portion M2 is smaller than the distance (height) of the protrusion M1 from the near-side interface 18 (the near-side interface 18 before undergoing a change in shape) to the peak of the protrusion M1. In other words, it can be said that the recording spot M as a whole has a generally protruding shape. Although the principle of formation of the recording spot M having a centrally protruding shape is not elucidated, we assume as follows in comparison with the principle of recess portion formation in the conventionally-known recording method wherein a recessed shape is formed at a center portion of the recording beam-irradiated area (this principle is also based on an assumption).

Explanation is first made on the conventional recording method. According to J. Appl. Phys. 62, 1123 (1987) "Thermal expansion and flow model for pit formation in laser marking of polymeric film optical disks," when a recording material is irradiated with a recording beam, the temperature of the recording material is raised and the recording material (recording layer 14) expands as shown in FIG. 4(a) (the hatched area shows a heated region). And as seen in FIG. 4(b), the expanding portion outflows due to surface tension. Thereafter, as seen in FIG. 4(c), the expanded recording material contracts as the temperature of the recording material lowers, with the result that the outflowing portion which has spilt outside the recording beam-irradiated area forms a protrusion because the recording material remains at a position higher than the reference surface (i.e., the upper surface of the recording layer 14), whereas the center portion of the recording beam-irradiated area forms a recess portion lower than the reference surface because the recording material has flowed out.

In contrast, according to the optical information recording material in this embodiment, the recording material 14 is subject to thermal expansion by irradiation with the recording beam RB, with the result that as with the conventional recording method, the recording layer 14 sticks out as shown in FIG. 4(*a*). However, since the recording layer 14 is relatively thick in this embodiment, the viscosity of the recording layer 14 near the surface of the recording layer 14 is not so low as that of the recording layer 14 in the conventional recording method, and thus outflowing of the recording material such as shown in FIG. 4(*b*) does not occur. Accordingly, it is assumed that when the expanded portion contracts as the temperature of the recording material lowers, the recording beam-irradiated area changes from the shape shown in FIG. 4(*a*) into the shape shown in FIG. 2 such that a protrusion M1 is left at the center and a recess portion M2 is formed to surround the protrusion M1.

Figure 3:
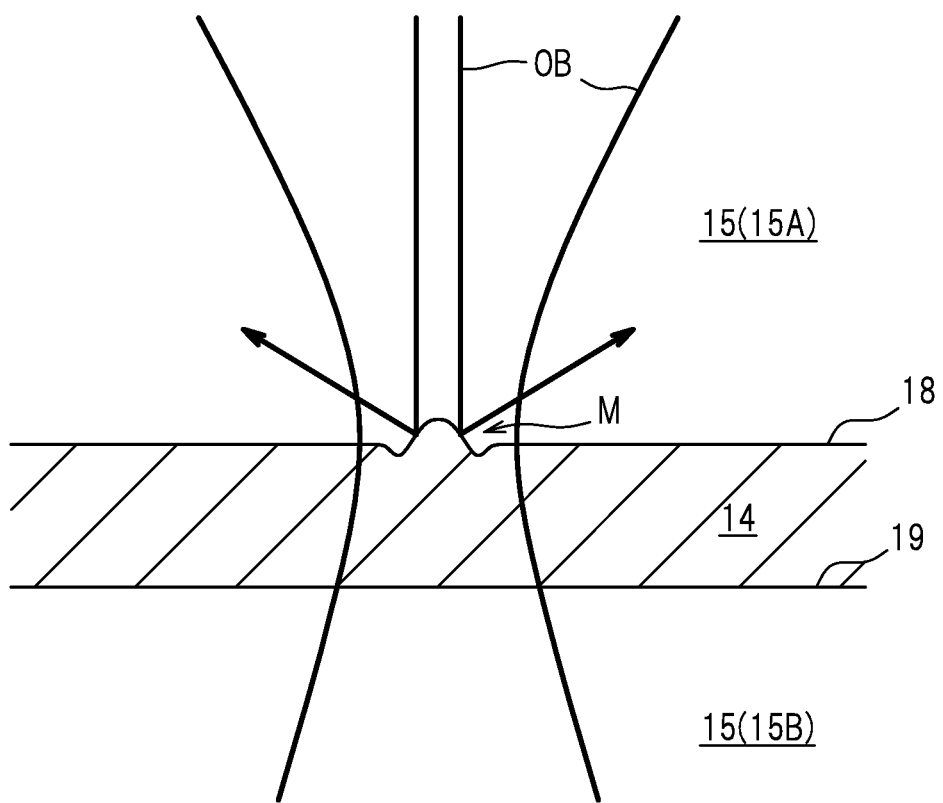
FIG. 3 is a view explaining the time of reading out the information.

As seen in FIG. 3, when the recording spot M formed as described above is irradiated with the reading beam OB using a continuous-wave laser, a difference in light intensity is created between the light reflected at the portion surrounding the recording spot M in the near-side interface 18 and the light reflected at the recording spot M, because of the difference in the refractive index between the recording layer 14 and the first intermediate layer 15A. The recording spot M can be detected from this modulation. For the purpose of this optical detection, it is preferable that the protrusion M1 sticks out in the range of 1-300 rim as compared to the interface (near-side interface 18) before undergoing a change in shape.

In this embodiment, since the recording spot M includes the recess portion M2 surrounding the protrusion M1, it is assumed that when the recording spot M is irradiated with the reading beam OB to read the recording spot M, the light intensity distribution of the reflected light at the recording spot M shows an abrupt change in accordance with the distance from the center of the protrusion M1, as compared to a recording spot M without a recess portion M2 and only including a protrusion M1. This makes it possible to read the recording spot M with high degree of modulation.

To erase the information recorded in the recording layer 14, the recording layer 14 is heated to a temperature around the glass transition temperature of the polymer binder, preferably to a temperature higher than the glass transition point, so that the fluidity of the polymer binder is increased and the deformation in the near-side interface 18 disappears due to surface tension to thereby return to its original flat plane. As a result, the information recorded in the recording layer 14 can be erased. Because the information is erasable, re-recording in the recording layer 14 (repeated recording) can be achieved. When the recording layer 14 is heated for that purpose, the recording layer 14 may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser used may be the laser used for reading out the information, or alternatively, another laser may be used. In both cases, it is preferable that a laser used emits light having a wavelength absorbable by a one-photon absorption dye.

Further, when the information is to be erased by heating the recording layer 14, the optical information recording medium 10 may be heated as a whole to a temperature higher than the glass transition temperature of the polymer binder so that the information recorded in all the recording layers 14 can be erased at once. Accordingly, irrespective of the kind of dyes contained in the recording layer 14, all the information recorded in the optical information recording medium is easily erased for initialization. Further, when the optical information recording medium is to be disposed of, the information can be easily erased.

As described above, in the optical information recording medium 10 according to this embodiment, information can be recorded as recording spots M each having a protruding shape formed by the near-side interface 18 sticking out from the recording layer 14 toward the first intermediate layer 15A. Unlike the conventional recording method of producing a recess portion, formation of the recording spot M does not require high fluidity to be given to the recording layer 14, which leads to recording with high sensitivity.

Further, in the optical information recording medium 10 according to this embodiment, the recording layer 14 and the second intermediate layer 15B located on both sides of the far-side interface 19 and not involved in reading out the information have substantially the same refractive index, with the result that the reflection of the record/readout beam does not occur at the far-side interface 19 and the recording beam and the reading beam can reach far deeper recording layers 14. Therefore, the number of recording layers 14 can be increased. Further, since the reflection does not substantially occur at the far-side interface 19, the reflected light at the near-side interface 18 and the reflected light at the far-side interface 19 do not interfere with each other during reading of the information. This can improve the signal-to-noise ratio at the time of reading the information.

Although one exemplary embodiment of the present invention has been described above, the present invention is not limited to the above-described embodiment and various changes and modifications may be made where necessary.

For example, in the above embodiment, only the near-side interface 18 undergoes a change in shape by irradiation with the recording beam. However, an alternative configuration may be conceivable such that only the far-side interface 19 undergoes a change in shape so as to protrude toward the intermediate layer 15 (second intermediate layer 15B) to form a protrusion. In this case, it is preferable that a relatively soft material (e.g., material softer than the recording layer 14) is used for the second intermediate layer 15B or the recording beam-illuminating portion is shifted. Another alternative configuration may also be conceivable such that both of the near-side interface 18 and the far-side interface 19 undergoes a change in shape; however, in terms of ease of reading out the recording spots M, it is preferable that one of the near-side interface 18 and the far-side interface 19 is caused to undergo a change in shape.

Further, in the above embodiment, the intermediate layer 15 consists of two layers including the first intermediate layer 15A and the second intermediate layer 15B. However, the intermediate layer 15 may be a homogenous layer throughout its entire material in the thickness direction thereof.

EXAMPLES

Description will be given of experiments for recording on and erasing from an optical information recording medium according to the present invention.

1. Recording Material

In these examples, a recording material which contains a polymer binder and dye dispersed in the polymer binder was used.

(1) Polymer Binder

Polyvinyl acetate (from Across Co., Ltd.; Mw: 101600) or polymethylmethacrylate (from SIGMA-ALDRICH Corporation) was used as the polymer binder.

(2) Dye

Either one of or both of phthalocyanine-based one-photon absorption dye with the following structure C-1 and two-photon absorption dye with the following structure C-2 were used as the dye.

[Chem. 3]

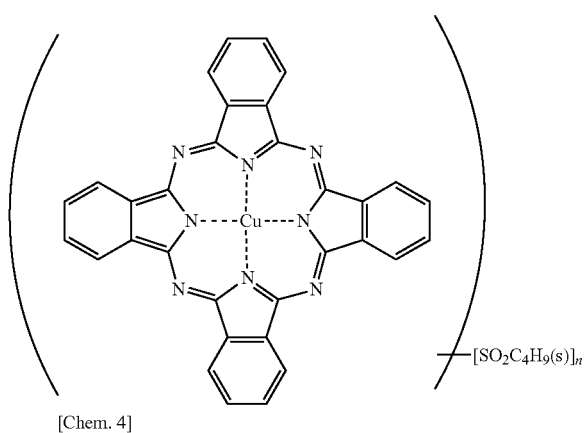

C-1

[Chem. 4]

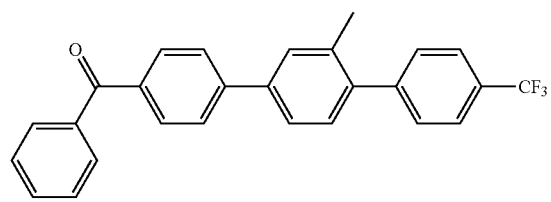

C-2

2. Formation Method for Recording Layer

Dye and a polymer binder were dissolved in a solvent (described later) while stirring to obtain a coating liquid. The coating liquid was applied to a glass substrate by spin coating to form a film on the glass substrate. The thickness of the film was 1 μm. The refractive index of the glass substrate was 1.53.

3. Thermal Analysis Method for the Material

The glass transition temperature of the polymer binder and the melting point and the decomposition point of the dye were determined by the following method.

Analytical method: TG-DTA (thermogravimetric/differential thermal analyzer) measurement Device: TG-DTA6300 (from Seiko Instruments Inc.)
Rate of temperature increase: 10° C./min
Measured temperature range: from 25° C. to 600° C.
Measured atmosphere: nitrogen ($N_2$) atmosphere The following temperatures were used as the glass transition temperature, the melting point, and the decomposition point (or vaporization temperature).

(1) Glass Transition Temperature

In an endothermic reaction of the polymer binder without weight reduction, the peak temperature was regarded as the glass transition temperature.

(2) Melting Point

In an endothermic reaction of the dye without weight reduction, the peak start time obtained by extrapolation was regarded as the melting point.

(3) Decomposition Point (or Vaporization Temperature)

The decomposition point (or vaporization temperature) was determined as the temperature at which the weight of the dye was reduced by 10% as compared to the dye before the decomposition. If a plurality of decomposition points existed, the lowest temperature was used for comparison.

Results of this thermal analysis were shown in the following table.

TABLE 1

| | Glass transition temperature [° C.] | Melting point [° C.] | Decomposition temperature [° C.] |
|---|---|---|---|
| Polymer binder | | | |
| Polyvinyl acetate | 32 | — | — |
| polymethylmethacrylate | 104 | — | — |
| polybisphenol-A-carbonate | 147 | — | — |
| One-photon absorption dye | | | |
| C-1 compound | — | — | 349 |
| Two-photon absorption dye | | | |
| C-2 compound | — | 138 | 301 |

4. Test/Estimation Method for Recording and Reading Information

The recording layer was irradiated with a recording beam (pulsed laser: wavelength of 522 nm, repetition frequency of 3 GHz, pulse width of 500 fsec, average power Pa of 5-50 mW, and peak power Pp of 3-33 W) with the peak power of 10 W.

With respect to the recording layer, the focal position of the recording beam was moved in the optical axis direction by 0.4 μm increments from 0.4 to 4 gm (i.e., 11 points in the depth direction), and a test was performed for four points each including these 11 focal positions, namely the total of 44 recording positions were tested.

Recording conditions were adjusted by changing the recording time from 5 μs to 5 ms. The recording time [μs] required for recording 12 recording spots (i.e., 3 points at adjacent focal positions in each depth direction times the four points) was measured to obtain data.

Observations were made on some of these examples using an atomic force microscope (AFM) and an optical microscope. Observation conditions were as follows:

Atomic force microscope
Device: Nano Search Microscope OLS-3500 (manufactured by Olympus Corporation)
Observation conditions: Dynamic mode, Scanning range of 10 μm, Scanning speed of 1 Hz, With the use of High-aspect-ratio probe AR5-NCHR-20 (manufactured by NanoWorld AG)

Optical microscope
Device: ECLIPSE LV 150 (manufactured by Nikon Corporation)
Observation conditions: Objective lens ×100, Dark-field observation Further, the recording spot was illuminated with the reading beam using a 405 nm continuous-wave laser (CW laser) with the power of 0.5 mW, and the quantity of the reflected light was read.

Degree of modulation was defined by the following equation and calculated with reference to the experimental results:

Degree of modulation={(Quantity of light reflected at the non-illuminated area)−(Quantity of light reflected at the illuminated area)}/(Quantity of light reflected at the non-illuminated area)

5. Conditions of Examples and Comparative Examples

Conditions of examples and comparative examples were as follows:

Example 1

| Solvent | methyl ethyl ketone (MEK) | 7 g |
|---|---|---|
| Dye | C-1 compound | 15 mg |
| Polymer binder | polyvinyl acetate (PVAc) | 500 mg |

Example 2

Conditions of Example 2 were the same as those of Example 1, except that the following compound was used as the dye.

| Dye | C-2 compound | 72 mg |
|---|---|---|

Example 3

Conditions of Example 3 were the same as those of Example 1, except that the following two compounds were used as the dye.

| Dye | C-1 compound | 15 mg |
|---|---|---|
|  | C-2 compound | 72 mg |

Example 4

Conditions of Example 4 were the same as those of Example 2, except that the polymer binder was replaced with the following one:

| Polymer binder | polymethylmethacrylate (PMMA) | 500 mg |
|---|---|---|

Comparative Example 1

Unlike Example 2, the recording layer was produced without using the polymer binder and only with the C-2 compound (two-photon absorption dye).

Comparative Example 2

Conditions of Comparative Example 2 were the same as those of Example 2, except that the polymer binder was replaced with the following one:

| Polymer binder | polybisphenol-A-carbonate (from SIGMA-ALDRICH Corporation; Mw: 29000) | 500 mg |
|---|---|---|

6. Results

With respect to the above Examples and Comparative Examples, configurations and recording times were shown in FIG. 5.

As seen in FIG. 5, in Examples 1-4, the glass transition temperature of the polymer binder was lower than the melting point or the decomposition point of the dye. Recording spots were formed in all of Examples 1-4.

Figure 6:
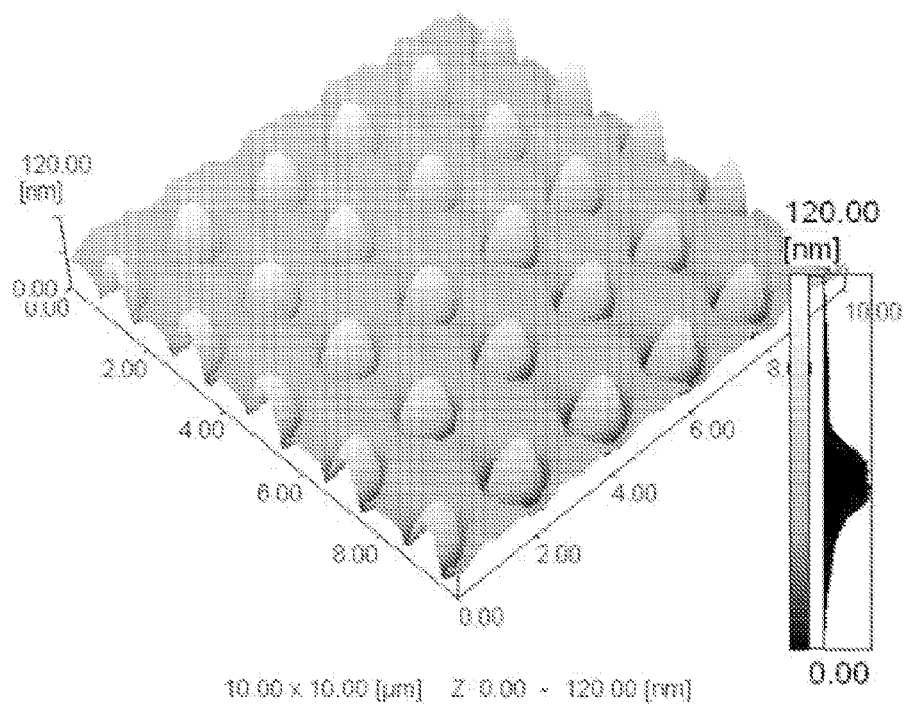
FIG. 6 is an image of the recording spots obtained by an atomic force microscope.
Figure 7:
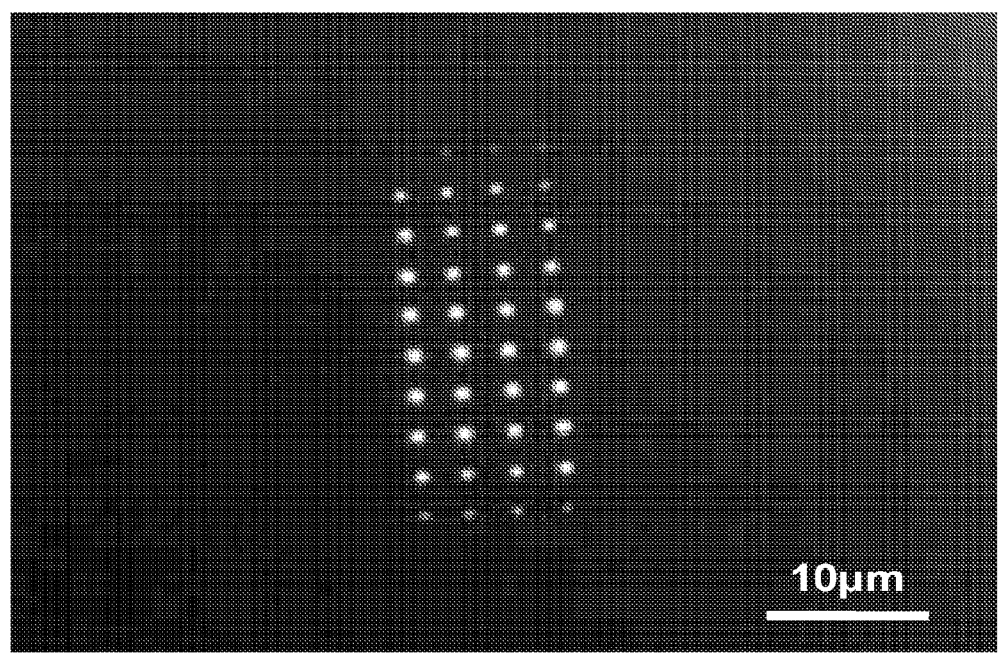
FIG. 7 is an image of the recording spots obtained by an optical microscope.

Shapes of the recording spots recorded in Example 2 were measured using the AFM, and the measurement results were shown in FIG. 6 in three dimensions. Recording spots recorded in Example 2 were observed using the optical microscope, and the observed image was shown in FIG. 7. As shown in FIG. 6, each of the recording spots has a protrusion at a center thereof, and a recess portion surrounding the protrusion. Further, as seen in FIG. 7, recording spots were clearly shown in the observation using the optical microscope, which means that optical reading of the recording spots could be successfully carried out.

In the above Example 2, the recording test was carried out without providing an intermediate layer, however, a similar recording test was carried out by applying a tacky agent on the recording layer to form an intermediate layer. Thereafter, the intermediate layer was removed and then the observation was carried out using the atomic force microscope; in this observation too, recording spots each having a protruding shape similar to that observed in the above Example 2 could be observed. The glass transition temperature of the intermediate layer (tacky agent) used was −53° C.

Figure 8:
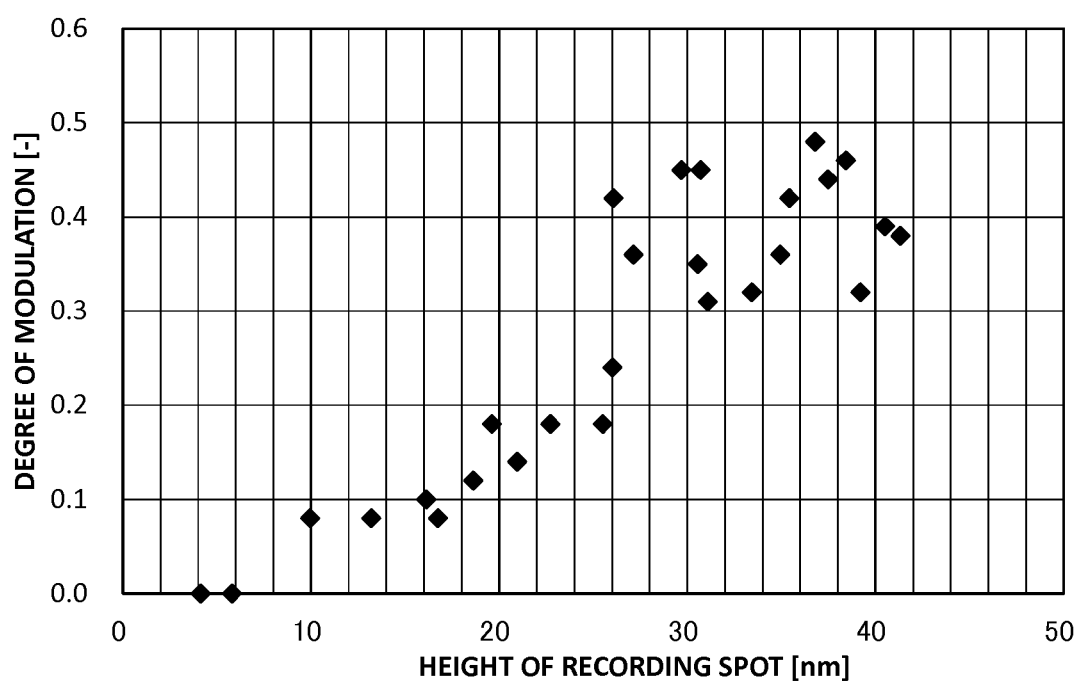
FIG. 8 is a graph showing the relationship between the height of each recording spot and the degree of modulation.

Further, the measurement was carried out for the plurality of recording spots by measuring the height from the upper surface of the recording layer, which was determined as the height before undergoing a change in shape, and the relationship between the height of each recording spot and the degree of modulation was shown as distribution in FIG. 8. FIG. 8 revealed that the higher the height of the recording spot the more the degree of modulation becomes. To ensure the degree of modulation being 0.1, it is preferable that the height of the protrusion in the recording spot is equal to or more than 10 nm, and to ensure 0.2, it is preferable that height of the protrusion is equal to or more than 25 nm. The image of the recording sports observed by the optical microscope as shown in FIG. 7 was obtained by shifting the focal position as it goes from upper to lower positions. Variation in the heights of the recording spots was derived from this shift of the focal position. As is clear from FIG. 7, the height of the protrusion became higher at the recording spot in which the focus was more precisely brought in the recording layer, and a higher degree of modulation was obtained. On the contrary, the height of the protrusion became lower at the recording spot in which the focus was shifted farther from the recording layer, and a lower degree of modulation was obtained. In other words, it can be said that the height of the protrusion in the recording spot (degree of modulation) can be adjusted by adjusting the focal position.

Reference is now made to Examples 1-3, in which polyvinyl acetate was used as the polymer binder. When only the two-photon absorption dye (C-2) was used as the dye (Example 2), it took 90 μsec to form a recording spot. When only the one-photon absorption dye (C-1) was used as the dye (Example 1), it took 15 msec to form a recording spot. Further, when both of the one-photon absorption dye (C-1) and the two-photon absorption dye (C-2) were used as the dye, it took only 5 μsec to form a recording spot. Namely, recording at the highest sensitivity was observed when both of the one-photon absorption dye and the two-photon absorption dye were used.

In Example 4, the polymer binder with a higher glass transition temperature was used, and it took more time to form a recording spot than Examples 1-3. However, recording could still be made in only 450 μsec.

In Comparative Example 1, a recording spot was not formed under conditions of no polymer binder and with a smaller absorption ratio of 1.8%.

In Comparative Example 2, a recording spot was not formed under conditions that the glass transition temperature of the polymer binder was higher than the melting point of the dye and the recording beam had the peak power of 10 W.

The above results show that an optical information recording medium according to the present invention enables recording with high sensitivity. According to the research paper entitled: "The static recording and read out of the twenty-recording layers containing organic dye materials" (Yuki Suzuki et al.; ISOM'09 Technical Digest, P. 202 (Presentation number: Tu-PP-09), the purpose of which is to achieve recording in the recording layer using one-photon absorption dye to be decomposed by irradiation with a laser beam and even with a low absorption ratio of the recording layer, a recording medium with twenty recording layers was produced such that the absorption ratio of the recording beam per one recording layer was equal to lower than 16%, and recording was carried out using a 2.8 mw, 405 nm laser diode. In this instance, recording in the first recording layer was made by irradiation duration from 8 to 400 ms. Even when comparing the above Examples with this report, it was shown that a high sensitivity recording was performed in the optical information recording medium according to the present invention.

[Erasing Records]

The optical information recording media with recording spots formed in Examples 1-3 (i.e., media containing polyvinyl acetate as the polymer binder) were heated for one hour at 80° C. using an oven. The optical information recording medium with recording spots formed in Example 4 (i.e., medium containing polymethylmethacrylate as the polymer binder) was heated for one hour at 120° C. using an oven. In any of these optical information recording media, the recording spots disappeared, which showed that the records were erasable.

What is claimed is:

1. An optical information recording medium comprising:
    a plurality of recording layers; and
    intermediate layers each having an absorption ratio with respect to a recording beam not greater than 1% and arranged in contact with two adjacent recording layers,
    wherein each of the recording layers includes a polymer binder and dye dispersed in the polymer binder, and a thickness of each recording layer is equal to or greater than 50 nm,
    wherein a first interface is formed between a recording layer and an intermediate layer that is adjacent to the recording layer on one side of the recording layer in a thickness direction of the recording layer, and a second interface is formed between the recording layer and an intermediate layer that is adjacent to the recording layer on the other side of the recording layer in the thickness direction of the recording layer,
    wherein when the recording layer is irradiated with the recording beam, the dye absorbs the recording beam and generates heat, wherein the polymer binder undergoes a change in shape by the generated heat, so that at least one of the first interface and the second interface undergoes a change in shape and sticks out toward the intermediate layer to form a protrusion, whereby information is recorded in the optical information recording medium,
    wherein the number of the recording layers is at least 10, and
    wherein each of the recording layers has an absorption ratio with respect to the recording beam not greater than 5% per one layer.

2. The optical information recording medium according to claim 1, wherein the protrusion is surrounded by a recess portion which is recessed toward the recording layer as compared to the at least one of the first interface and the second interface before undergoing a change in shape.

3. The optical information recording medium according to claim 1, wherein the intermediate layer is softer than the recording layer at least in the proximity of the interface in which the protrusion is formed.

4. The optical information recording medium according to claim 1, wherein a glass transition temperature of the intermediate layer in the proximity of the interface in which the protrusion is formed is lower than that of the recording layer.

5. The optical information recording medium according to claim 1, wherein the protrusion is formed at only one of the first interface and the second interface, and the protrusion is not formed at the other one of the second interface and the first interface, and wherein a difference between refractive indices of the intermediate layer and the recording layer is greater at the interface in which the protrusions is formed than at the interface in which the protrusion is not formed.

6. The optical information recording medium according to claim 5, wherein the refractive index of the intermediate layer at the interface in which the protrusion is not formed is substantially equal to the refractive index of the recording layer.

7. The optical information recording medium according to claim 1, wherein the protrusion sticks out in the range of 1-300 nm as compared to the interface before undergoing a change in shape.

8. The optical information recording medium according to claim 1, wherein the dye contains a multi-photon absorption compound.

9. The optical information recording medium according to claim 1, wherein a thickness of each of the recording layers is in the range of 200 nm to 5 μm.

10. An optical information recording medium comprising:
    a plurality of recording layers; and
    intermediate layers each having an absorption ratio with respect to a recording beam not greater than 1% and arranged in contact with two adjacent recording layers,
    wherein each of the recording layers includes a polymer binder and dye dispersed in the polymer binder, and a thickness of each recording layer is equal to or greater than 50 nm,
    wherein a first interface is formed between a recording layer and an intermediate layer that is adjacent to the recording layer on one side of the recording layer in a thickness direction of the recording layer, and a second interface is formed between the recording layer and an intermediate layer that is adjacent to the recording layer on the other side of the recording layer in the thickness direction of the recording layer,
    wherein when the recording layer is irradiated with the recording beam, the dye absorbs the recording beam and generates heat, wherein the polymer binder undergoes a change in shape by the generated heat, so that at least one of the first interface and the second interface undergoes a change in shape and sticks out toward the intermediate layer to form a protrusion, whereby information is recorded in the optical information recording medium, and wherein $0.001 < ((n2-n1)/(n2+n1))^2 < 0.04$ is satisfied, where n1 is a refractive index of each recording layer, and n2 is a refractive index of one of the first and second interfaces in which the protrusion is formed.

11. The optical information recording medium according to claim 10, wherein the number of the recording layers is at least 10.

12. The optical information recording medium according to claim 11, wherein each of the recording layers has an absorption ratio with respect to the recording beam not greater than 5% per one layer.

13. An optical information recording medium comprising:
a plurality of recording layers; and
intermediate layers each having an absorption ratio with respect to a recording beam not greater than 1% and arranged in contact with two adjacent recording layers,
wherein each of the recording layers includes a polymer binder and dye dispersed in the polymer binder, and a thickness of each recording layer is equal to or greater than 50 nm,
wherein a first interface is formed between a recording layer and an intermediate layer that is adjacent to the recording layer on one side of the recording layer in a thickness direction of the recording layer, and a second interface is formed between the recording layer and an intermediate layer that is adjacent to the recording layer on the other side of the recording layer in the thickness direction of the recording layer,
wherein when the recording layer is irradiated with the recording beam, the dye absorbs the recording beam and generates heat, wherein the polymer binder undergoes a change in shape by the generated heat, so that at least one of the first interface and the second interface undergoes a change in shape and sticks out toward the intermediate layer to form a protrusion, whereby information is recorded in the optical information recording medium, and
wherein the intermediate layers comprise a first intermediate layer adjacent to the first interface and a second intermediate layer adjacent to the second interface, and wherein the first intermediate layer and the second intermediate layer are merged with each other such that a refractive index gradually changes at an interface between them.

* * * * *